(12) United States Patent
Chen (10) Patent No.: US 9,228,675 B2
(45) Date of Patent: Jan. 5, 2016

(54) TWO-SEGMENT JOYSTICK IDENTIFICATION STRUCTURE FOR WATER CONTROL VALVE

(71) Applicant: Mei-Li Chen, Tanzih Township, Taichung County (TW)

(72) Inventor: Mei-Li Chen, Tanzih Township, Taichung County (TW)

(73) Assignee: KUCHING INTERNATIONAL LTD., Tanzih Township, Taichung County (TW)

( * ) Notice: Subject to any disclaimer, the term of this patent is extended or adjusted under 35 U.S.C. 154(b) by 80 days.

(21) Appl. No.: 14/215,273

(22) Filed: Mar. 17, 2014

(65) Prior Publication Data

US 2015/0260307 A1    Sep. 17, 2015

(51) Int. Cl.
*F16K 31/60*    (2006.01)
*F16K 11/078*    (2006.01)
*F16K 27/04*    (2006.01)

(52) U.S. Cl.
CPC ........... *F16K 31/605* (2013.01); *F16K 11/0782* (2013.01); *F16K 11/0785* (2013.01); *F16K 27/044* (2013.01)

(58) Field of Classification Search
CPC . F16K 11/0782; F16K 1/0785; F16K 31/605; F16K 27/044; E05C 1/04
USPC .............................. 137/625.17, 625.4, 625.41
See application file for complete search history.

(56) References Cited

U.S. PATENT DOCUMENTS

| | | | | |
|---|---|---|---|---|
| 4,995,419 A | * | 2/1991 | Pawelzik et al. | 137/316 |
| 5,417,242 A | * | 5/1995 | Goncze | 137/625.17 |
| 7,032,272 B2 | * | 4/2006 | Haenlein | 16/366 |
| 7,861,742 B2 | * | 1/2011 | Kim | 137/625.4 |
| 9,091,357 B2 | * | 7/2015 | Chen | |

* cited by examiner

*Primary Examiner* — Kevin Lee
(74) *Attorney, Agent, or Firm* — Egbert Law Offices, PLLC (57) ABSTRACT

A two-segment joystick identification structure for a water control valve has a radial through-type holding hole, a step-shaped actuating rod, an internal holding groove, an elastic expandable assembly and a resisting and drive surface. The identification structure achieves a two-segment hand feel identification effect of the joystick of the water control valve and thus saves water, has compact components, simple fabrication, convenient assembly and practical advancement.

4 Claims, 7 Drawing Sheets

TWO-SEGMENT JOYSTICK IDENTIFICATION STRUCTURE FOR WATER CONTROL VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to the local structure of a water control valve, and more particularly to an innovative two-segment joystick identification structure for a water control valve.

2. Description of Related Art Including Information Disclosed Under 37 CFR 1.97 and 37 CFR 1.98.

In the structural design of the water control valve, the water supply on and off state switching and the water supply volume adjustment is mainly controlled through the variance of the vertical swing angle of a joystick. The swing angle of said joystick corresponds with the pulling angle of the handle on the water faucet. So, it is known through the general application experience that the actuation angle stroke from the joystick off state to the fully open state of water volume is actually quite short, generally between about 25 degrees to 35 degrees only.

Due to the abnormal climate and water resource scarcity problems in recent years, the technology concerning water saving of water control products has always been an important subject focused, considered and broken through by relevant industries. During operation of the water faucet handle mentioned in the previous paragraph, the handle is often easily operated to the fully open angular position of water volume when a user pulls the handle upwards with an ordinary force, thus, causing the water resource waste and loss during the process of water usage. Moreover, this problem is difficult to be improved from the users' aspect, because it is usually very difficult for most users to change a long-established habit. It is still a very feasible solution to improve the aforementioned problem by making changes in the structure and form design of the water control valve.

For the current conventional technologies, although a number of segmented engagement and positioning structural forms have been developed by relevant industries to be provided on water control valve joysticks in order to achieve the water-saving function through the segmented identification, there are still some problems and disadvantages in general. The reason is that the segmented engagement and positioning structures equipped on the conventional water control valve joysticks are usually functional by way of inserting the elastic top bead into a groove. However, because the elastic top bead in this kind of structure form consists of a metal bead body and a spring, the volume of said metal bead and spring must be quite small to be able to be assembled in the very narrow and limited joystick structure in a water control value. As a result, the problems like inconvenience in assembling, inefficient and slow manufacturing hours and defect rate increase are resulted inevitably due to the too small components.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The "two-segment joystick identification structure for water control valve" disclosed in present invention is to utilize the innovative and unique structural form and technical characteristics constituted by said structures like the radial through-type holding hole, step-shaped actuating rod, internal holding groove, elastic expandable assembly and resisting and drive surface, against the prior art mentioned conventional structure, as described in the previous section, to achieve the two-segment hand feel identification effect of the joystick of the water control valve and thus the water saving benefit, characteristic of the compact components, simple fabrication, convenient assembly and practical advancement.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
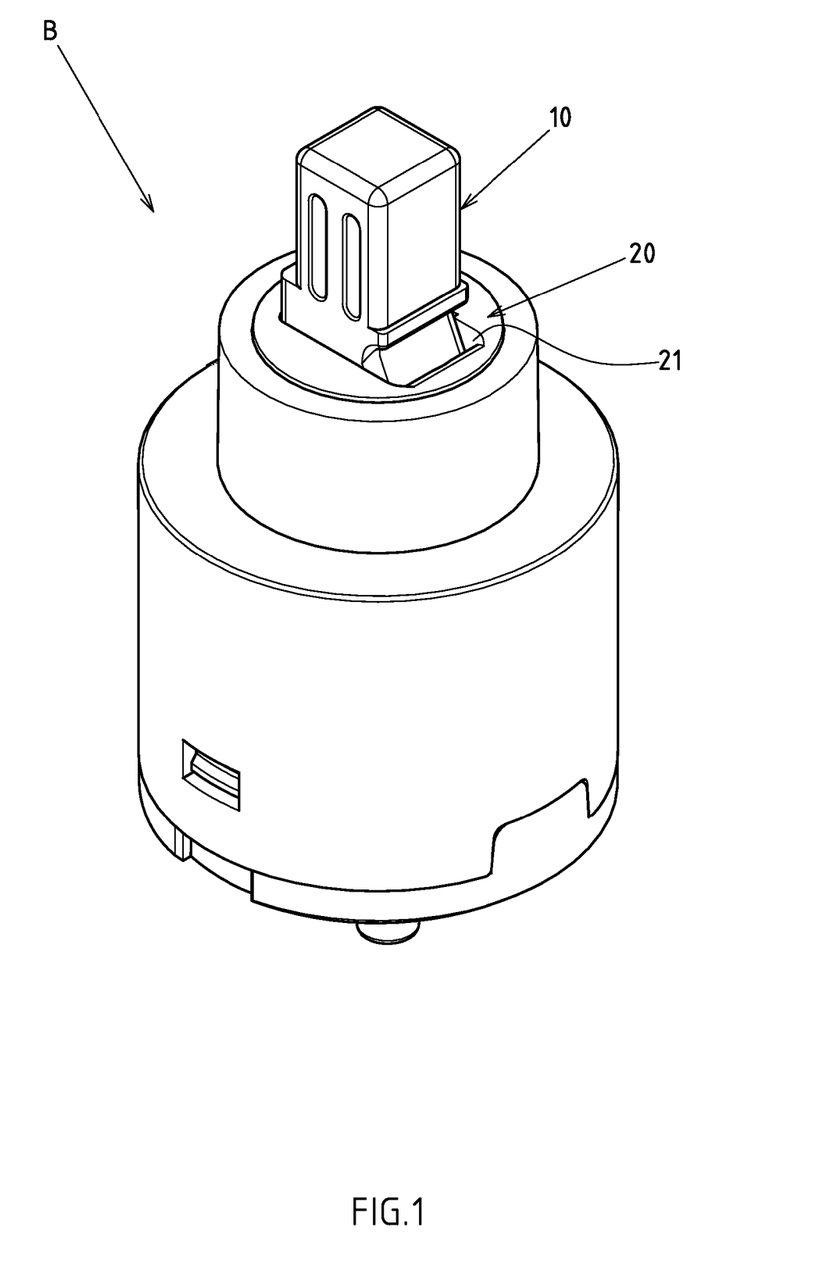
FIG. 1 is the water control valve stereogram of the better preferred embodiment of the structure of the present invention.
Figure 2:
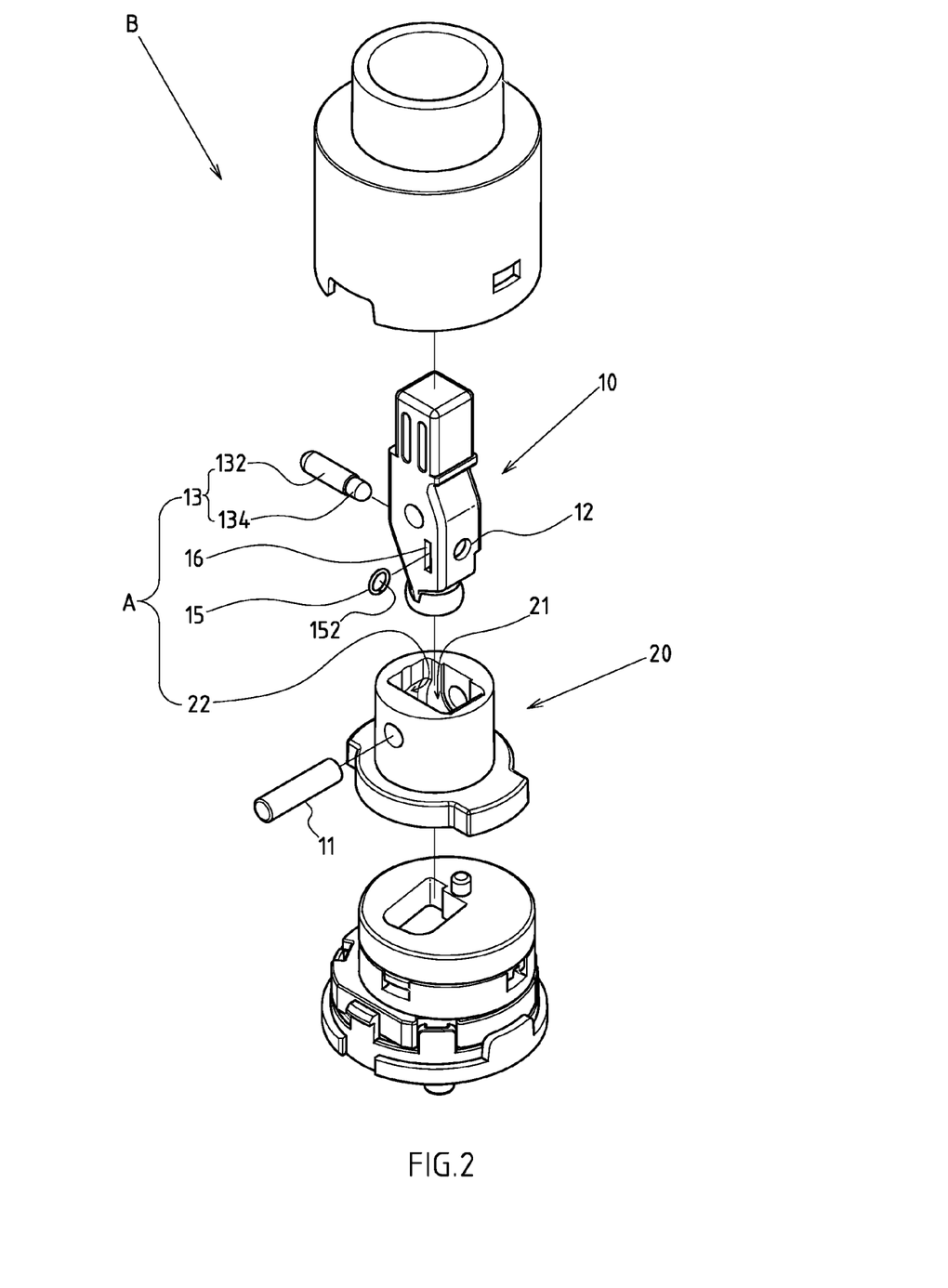
FIG. 2 is the main component deposition stereogram of the better preferred embodiment of the structure of the present invention.
Figure 3:
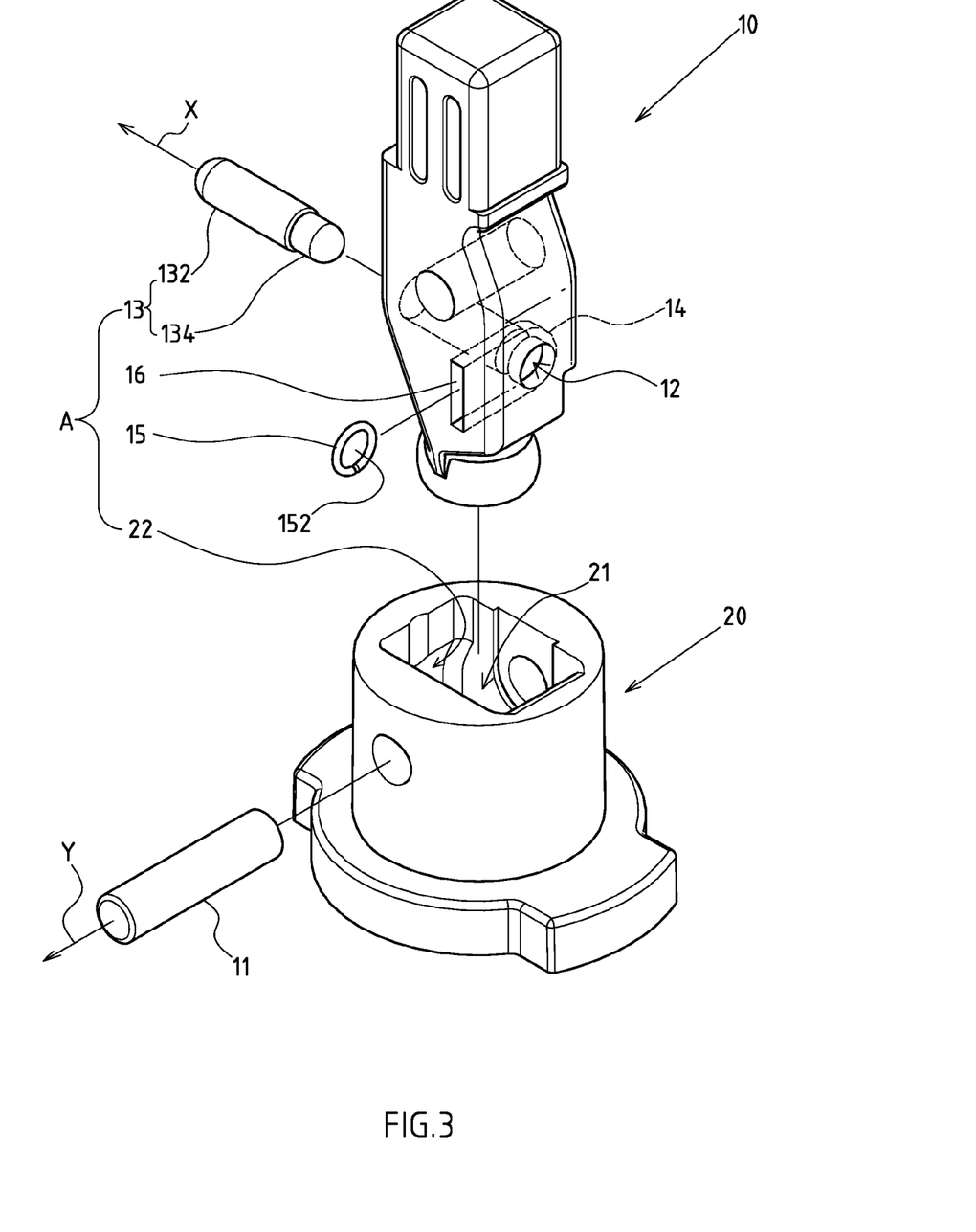
FIG. 3 is the enlarged drawing of a local component continued from FIG. 2.

Referring to FIGS. 1 to 3 for the better preferred embodiments of the two-segment joystick identification structure for water control valve of the present invention. These embodiments are for illustrative purposes only and the patent application is not restricted by this structure. Said two-segment identification structure A is provided on a joystick 10 capable of vertical swing on a water control valve B at a location corresponding with a rotating seat 20 set at the outside of joystick 10. The joystick 10 has a transverse axis 11 to be assembled in a nozzle 21 on the rotating seat 20.

Said two-segment identification structure A consists of the following components listed below.

A radial through-type holding hole 12 is located at the clearance height location underneath the transverse axis 11 of the joystick 10, passing through the joystick 10 in a radial manner.

A step-shaped actuating rod 13 is in an active axial displacement status and assembled and held in the radial through-type holding hole 12. The step-shaped actuating rod 13 comprises a large-diameter section 132 and a small-diameter section 134 where the outer diameter of the small-diameter section 134 is relatively smaller than the large-diameter section 132. The ends of the large-diameter section 132 and the small-diameter section 134 face to the different ends of the radial through-type holding hole 12 respectively.

An internal holding groove 14 is formed at a location in the radial through-type holding hole 12 and in a hole enlarging form. Also, when the joystick 10 is at the vertical angle and under the preset off mode, the location of the internal holding groove 14 corresponds with the small-diameter section 134 of the step-shaped actuating rod 13.

An elastic expandable assembly 15 is assembled and held in the internal holding groove 14. The elastic expandable assembly 15 has a bored portion 152 for the step-shaped actuating rod 13 to pass through. The inner diameter of the bored portion 152 is larger than the outer diameter of the small-diameter section 134 of the step-shaped actuating rod 13 and less than the outer diameter of the large-diameter section 132. The bored portion 152 is elastic capable of expansion under pressure and recover afterwards.

A resisting and drive surface 22 is located on the inner wall of nozzle 21 of the rotating seat 20 and in a vertical extending form. The resisting and drive surface 22 is provided for the ends of the large-diameter section 132 of the step-shaped actuating rod 13 to form the normal resistance to limit the active displacement state.

The elastic expandable assembly 15 is in a C-shaped fastener form or an elastic ring (such as the rubber ring) form. The elastic expandable assembly 15 shown in FIGS. 2 and 3 are in the C-shaped fastener form with the material not limited to metal or plastic.

As shown in details in FIG. 3, a assembly hole 16 even could be set at the clearance height location underneath the transverse axis at one side of the joystick 10. The inner end of the assembly hole 16 is connected to the internal holding groove 14, allowing the elastic expandable assembly 15 to be assembled into the internal holding groove 14 through the assembly hole 16.

As shown in FIG. 3, the set axial direction of the step-shaped actuating rod 13 (as indicated by Arrow X) has a vertical configuration relationship with the set axial direction of the transverse axis 11 of joystick 10 (as indicated by Arrow Y).

Figure 4:
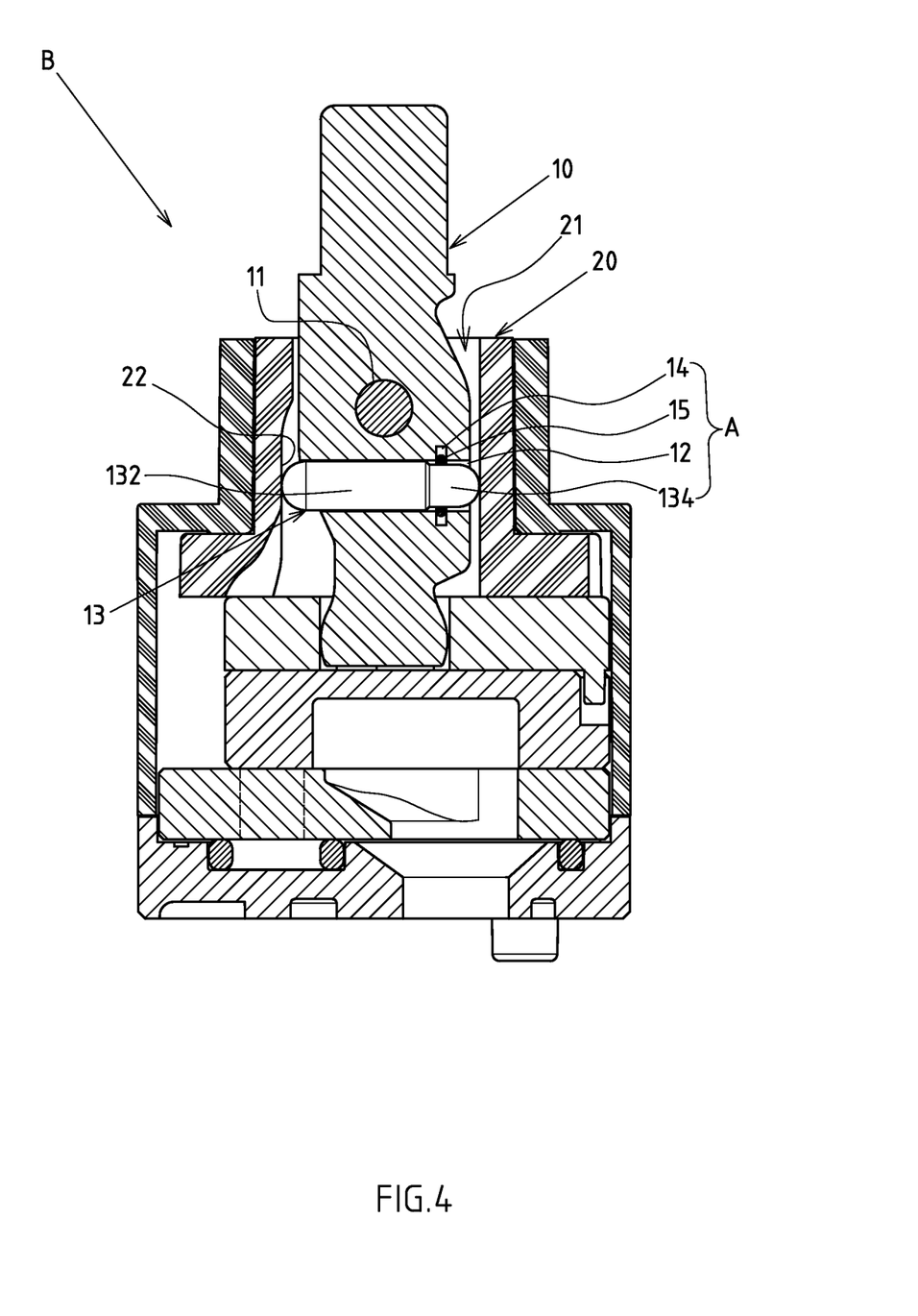
FIG. 4 is the assembly section view of the better preferred embodiment of the structure of the present invention and schematic diagram of the joystick at a vertical angle.
Figure 5:
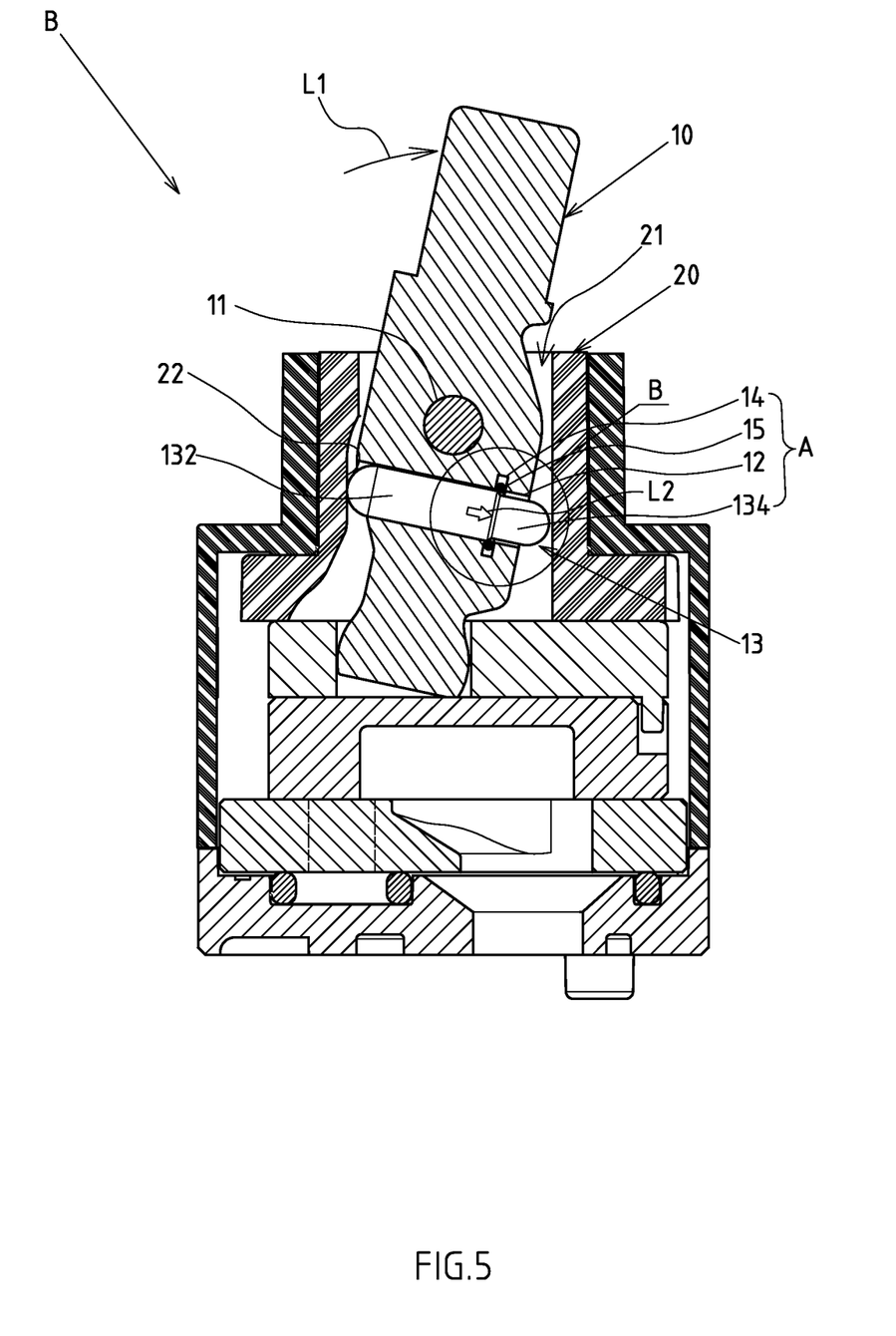
FIG. 5 is the schematic diagram of the section view of the process status of the joystick of the present invention swinging at an inclination angle to the water supply mode.
Figure 6:
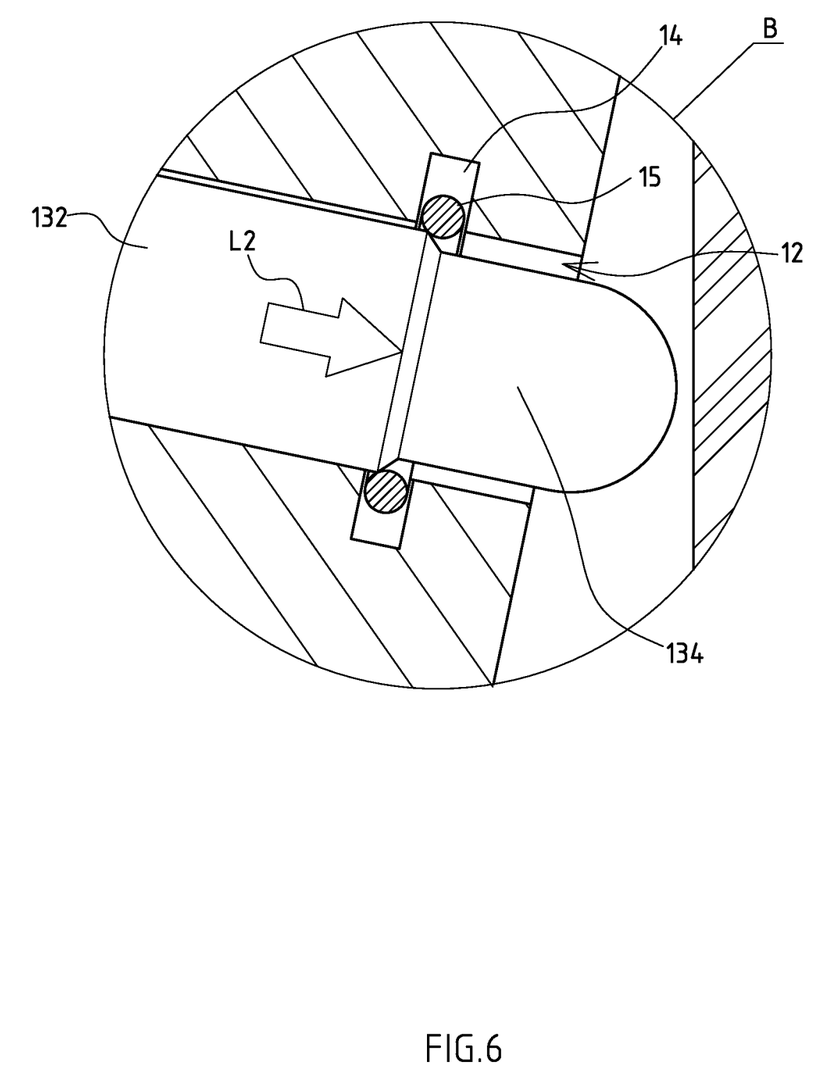
FIG. 6 is the enlarged drawing of Section B in FIG. 5.
Figure 7:
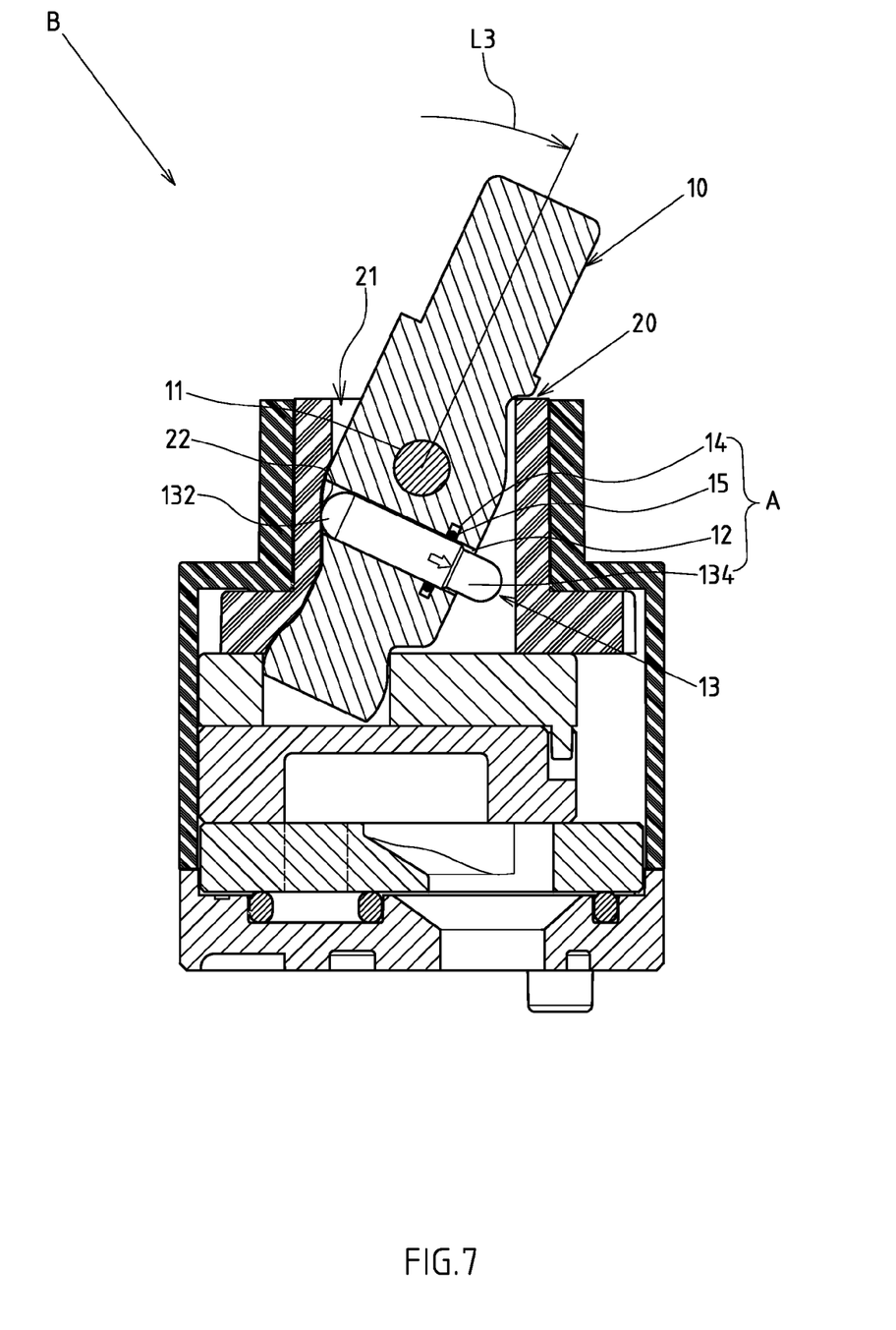
FIG. 7 is the section view of the status of the joystick of the present invention swinging to the biggest inclination angle.

With the design composed by the aforementioned structures, the application and actuation status of the two-segment identification structure A disclosed in the present invention is as shown first in FIG. 4. When the joystick 10 is at the vertical angle and under the preset off mode, the relative location status of the elastic expandable assembly 15 and the small-diameter section 134 of the step-shaped actuating rod 13 is established; in the process of the joystick 10 swinging to the inclination angle of the preset water supply mode (as indicated by Arrow L1 in FIG. 5), the step-shaped actuating rod 13 in the radial through-type holding hole 12 would move toward the direction of the small-diameter section 134 (as indicated by Arrow L2 in FIGS. 5 and 6), causing the large-diameter section 132 to move gradually to a location corresponding with the elastic expandable assembly 15. Wherein, in the process of the elastic expandable assembly 15 moving from the small-diameter section 134 to the large-diameter section 132, a force hindering the swing of joystick 10 would be developed. Therefore, a larger force must be applied in operation so that the joystick 10 could swing to the maximum inclination angle (as indicated by Arrow L3 in FIG. 7, namely, the maximum water supply mode status) and the elastic expandable assembly 15 is expanded and moves to the large-diameter section 132, thus achieving the two-segment hand feel identification effect. The purpose of getting this effect is mainly to achieve the advantages and purpose of water saving for the swing angle of said joystick 10 corresponds with the up-pulling angle of the water faucet handle. Therefore, through the technical characteristics of the two-segment identification structure A disclosed in the present invention, when the user pulls the water faucet handle up to a certain angle (such as 15 degrees), the user's hand will experience a hindrance sense. Then, if the user only needs to use a small amount of water, he/she will not continue to pull up the handle; and if the user needs to use a large amount of water, he/she needs to exert a greater force to pull up the handle to get it. Thus, it is able to prevent users from using the large-amount water mode easily so as to achieve the advantages and purpose of water saving.

In the aspects of fabrication and assembling, the components of the two-segment identification structure A disclosed in the present invention needing to be fabrication separately only include the step-shaped actuating rod 13 and elastic expandable assembly 15. Moreover, those two are simple in forms and easy for production. The radial through-type holding hole 12 could be made together with joystick 10 as one piece. The resisting and drive surface 22 could be made from the inner wall of the nozzle 21 of the rotating seat 20 as one piece. The assembling can refer to FIG. 3. Before the joystick 10 is installed in the nozzle 21 of the rotating seat 20, it could first assemble the elastic expandable assembly 15 into the internal holding groove 14 (note: it could be done through the assembly hole 16 at the side of the joystick 10); then assemble the step-shaped actuating rod 13 into the radial through-type holding hole 12; making the elastic expandable assembly 15 correspond with the small-diameter section 134 of the step-shaped actuating rod 13 in location; and assemble joystick 10 into the nozzle 21 of the rotating seat 20; then, the ends of the large-diameter section 132 of the step-shaped actuating rod 13 would go against the resisting and drive surface 22 provided on the inner wall of the nozzle 21 of the rotating seat 20 to form the limiting function, completing the assembly process of the two-segment identification structure A. In this assembly process, since the step-shaped actuating rod 13 is longer than the outer diameter of the joystick 10, not a small part, it is easy for the assembly personnel to hold and assembly without dropping it. The elastic expandable assembly 15, though small in volume, but could be limited in place firmly once it is assembled into the internal holding groove 14 in the radial through-type holding hole 12, very convenient for the assembly and alignment operation. Thus it can be seen that the two-segment identification structure A disclosed in the present invention is characterized by advantages of the compact components, simple fabrication, convenient assembly and practical advancement.

I claim:

1. An apparatus comprising:
a water control valve;
a joystick vertically swingable on said water control valve;
a rotating seat positioned at an outside of said joystick, said rotating seat having a nozzle, said joystick having a transverse axis assembled in said nozzle;
a radial through-hole formed below the transverse axis of said joystick, said radial through-hole extending radially through said joystick;
an actuating rod having a stepped shape assembled and retained in said radial through-hole, said actuating rod having a first diameter section and a second diameter section, said second diameter section having an outer diameter that is less than an outer diameter of said first diameter section, said first diameter section having an end facing one end of said radial through-hole, said second diameter section having an end facing an opposite end of said radial through-hole;
an internal holding groove formed in said radial through-hole, said internal holding groove having a location corresponding to said second diameter section of said actuating rod when said joystick is at a vertical angle;
an elastic expandable assembly assembled and retained in said internal holding groove, said elastic expandable assembly having a bored portion, said actuating rod passing through said bored portion, said bored portion having an inner diameter that is larger than the outer diameter of said second diameter section of said actuating rod and is smaller than the outer diameter of said first diameter section of said actuating rod, said bored portion being elastically expandable under pressure and recovering in an absence of pressure; and
a resisting and drive surface positioned on an inner wall of said nozzle of said rotating seat and extending vertically, said resisting and drive surface forming a resistance to limit a displacement of said first diameter section of said actuating rod.

2. The apparatus of claim 1, said elastic expandable assembly having a ring shape.

3. The apparatus of claim 1, further comprising:
an assembly hole formed below the transverse axis of said joystick, said assembly hole having an inner end connected to said internal holding groove, said elastic expandable assembly assembled into said internal holding groove through said assembly hole.

4. The apparatus of claim 1, said actuating rod having a set axial direction that is vertical relative to the transverse axis of said joystick.

* * * * *